(12) United States Patent
Bartlett

(10) Patent No.: US 12,732,294 B2
(45) Date of Patent: Sep. 8, 2026

(54) METHOD AND APPARATUS FOR DETERMINING A CLOCK FREQUENCY OFFSET

(71) Applicant: u-blox AG, Thalwil (CH)

(72) Inventor: David Bartlett, Camboume (GB)

(73) Assignee: u-blox AG, Thalwil (CH)

( * ) Notice: Subject to any disclaimer, the term of this patent is extended or adjusted under 35 U.S.C. 154(b) by 196 days.

(21) Appl. No.: 18/079,326

(22) Filed: Dec. 12, 2022

(65) Prior Publication Data

US 2023/0188238 A1 Jun. 15, 2023

(30) Foreign Application Priority Data

Dec. 14, 2021 (EP) .................................... 21214375

(51) Int. Cl.
*H04J 3/06* (2006.01)

(52) U.S. Cl.
CPC .................................. *H04J 3/0661* (2013.01)

(58) Field of Classification Search
CPC ..................................................... H04J 3/0661
USPC .......................................................... 370/503
See application file for complete search history.

(56) References Cited

U.S. PATENT DOCUMENTS 10,911,211 B1 * 2/2021 Kratz .................... H04J 3/0664
2012/0122485 A1 * 5/2012 Bartlett ................. G01S 5/0284 455/456.1
2018/0302869 A1 * 10/2018 Hollar ............... H04W 56/0025
2019/0199286 A1 * 6/2019 Hollar .................... H04B 17/12

(Continued)

FOREIGN PATENT DOCUMENTS

| | | |
|---|---|---|
| EP | 1145477 | 10/2001 |
| EP | 2749968 | 7/2014 |
| WO | WO 2000042728 | 7/2000 |

OTHER PUBLICATIONS

Extended Search Report in European Appln. No. 21214375.4, dated Jun. 8, 2022, 8 pages.

*Primary Examiner* — Faisal Choudhury
(74) *Attorney, Agent, or Firm* — Fish & Richardson P.C.

(57) ABSTRACT

The present disclosure relates to a method (400) for determining a clock frequency offset between a first device having a first clock and at least one second device having at least one second clock, the method comprising: receiving (401), by the at least one second device, at least one first message from the first device, wherein information regarding a time of departure of the at least one first message is in the at least one first message; determining (402), by the at least one second device, a time of arrival of the at least one first message; receiving (403), by the at least one second device, at least one second message from the first device, wherein information regarding a time of departure of the at least one second message is in the at least one second message; determining (404), by the at least one second device, a time of arrival of the at least one second message; and determining (405) a clock frequency offset between the first clock and the at least one second clock based on the time of departure of the at least one first message, the time of arrival of the at least one first message, the time of departure of the at least one second message, and the time of arrival of the at least one second message.

The disclosure further relates to a corresponding apparatus, system, computer program product and a computer readable storage medium.

10 Claims, 4 Drawing Sheets

(56) References Cited

U.S. PATENT DOCUMENTS

| | | | | |
|---|---|---|---|---|
| 2021/0058181 | A1 * | 2/2021 | Dwivedi | H04J 3/0667 |
| 2023/0080521 | A1 * | 3/2023 | Rosadini | H04L 63/1416 726/23 |

* cited by examiner

METHOD AND APPARATUS FOR DETERMINING A CLOCK FREQUENCY OFFSET

CROSS-REFERENCE TO RELATED APPLICATIONS

This application claims the benefit of priority to European Application No. 21214375.4, filed on Dec. 14, 2021, the contents of which are hereby incorporated by reference.

TECHNICAL FIELD

This disclosure relates to a method and an apparatus for determining a clock frequency offset between a first device having a first clock and at least one second device having at least one second clock. The disclosure further relates to a corresponding system, a corresponding computer program product and a corresponding computer readable storage medium.

BACKGROUND ART

In communication technologies, in particular in wireless communication technologies, determining timing related information between devices is an important issue. For example in order to synchronize a clock of a first device to a clock of a second device, the first device needs to obtain timing information regarding the clock of the second device. Such timing information may be related, for example, to a frequency and/or an offset of the clock of the second device with regard to the first device. Hence, it is an object of the present disclosure to present a method, apparatus, system, computer program product and computer readable storage medium to enable communication of such timing information between devices.

SUMMARY OF INVENTION

The above-mentioned object is solved by the subject-matter of the attached independent claims. Further embodiments are disclosed in the attached dependent claims.

According to a first aspect of the disclosure, a method for determining a clock frequency offset between a first device having a first clock and at least one second device having at least one second clock comprises:

- receiving, by the at least one second device, at least one first message from the first device, wherein information regarding a time of departure of the at least one first message is in the at least one first message;
- determining, by the at least one second device, a time of arrival of the at least one first message;
- receiving, by the at least one second device, at least one second message from the first device, wherein information regarding a time of departure of the at least one second message is in the at least one second message;
- determining, by the at least one second device, a time of arrival of the at least one second message; and
- determining a clock frequency offset between the first clock and the at least one second clock based on the time of departure of the at least one first message, the time of arrival of the at least one first message, the time of departure of the at least one second message, and the time of arrival of the at least one second message.

An advantage of this method is that a clock frequency offset between different devices, each having its own free-running clock used for time measurements, may be determined based on only two messages, exchanged between the respective devices, and the corresponding times of departures/times of arrivals. This way, a determination of the frequency offset is achieved in an easy and resource saving manner, wherein only low overhead is produced.

Another advantage of this method is that the clock frequency offset between the devices may be determined without knowledge regarding a distance between the respective devices.

The messages exchanged between the devices may be furthermore used for any kind of communication between the devices. In other words, the method according to the first aspect may be implemented in devices exchanging any kind of communication messages, from which the corresponding times of departure may be obtained. Hence, for determining the frequency offset according to the first aspect, no additional messages are needed in that case, and an overhead in a corresponding communication network may be reduced.

In the context of this application, a time of departure of a message defines a time at which the corresponding message is sent from a sending device. A time of arrival of a message defines the time at which the corresponding message is received at a receiving device. The clock frequency offset between clocks in this application defines the difference between frequencies of clocks, which is an indicator for how much slower/faster one clock runs compared to another clock.

The clock frequency offset may be determined by the at least one second device itself, or may be determined by any other entity which, in that case, obtains the relevant information, i.e., the time of departure of the at least one first message, the time of arrival of the at least one first message, the time of departure of the at least one second message, and the time of arrival of the at least one second message.

According to at least one embodiment the method further comprises:

- sending, by the at least one second device, at least one third message to the first device, wherein a time of departure of the at least one third message is determined by the at least one second device; and
- determining a clock phase offset between the first clock and the at least one second clock based on the time of arrival of the at least one first message, the time of departure of the at least one first message, the time of arrival of the at least one second message, the time of departure of the at least one second message, the time of departure of the at least one third message, and a time of arrival of the at least one third message.

An advantage thereof is that additionally to the clock frequency offset, also a clock phase offset may be determined based on only three messages, exchanged between the respective devices, and the corresponding times of departures/times of arrivals. This way, a determination of the phase offset is achieved in an easy and resource saving manner, wherein only low overhead is produced.

Another advantage herein is that also the clock phase offset between the devices may be determined without knowledge regarding a distance between the respective devices.

The clock phase offset may be determined by the at least one second device itself, or may be determined by any other entity which, in that case, obtains the relevant information, i.e., the time of arrival of the at least one first message, the time of departure of the at least one first message, the time of arrival of the at least one second message, the time of departure of the at least one second message, the time of departure of the at least one third message, and a time of arrival of the at least one third message.

According to at least one embodiment, the information regarding the time of departure of the at least one first message and/or of the at least one second message and/or of the at least one third message is in the at least one first and/or second and/or third message embedded in form of a time-stamp in the at least one first and/or second and/or third message or derivable from a predetermined scheduling of the at least one first and/or second and/or third message.

An advantage of embedding the information regarding the time of departure in the respective messages in form of a timestamp is that no additional information, for example regarding a scheduling of messages, is required by the respective devices. An advantage of the information regarding the time of departure being in the respective messages in form of a predetermined scheduling of the respective messages and therefore being derivable from said predetermined scheduling is that no further information needs to be added to the transmitted messages in order to inform the receiving device of the time of departure of the received message, thereby further reducing overhead. For example, when certain messages are sent by a transmitting device at certain points in time, known to the receiving device, the receiving device immediately knows the time of departure when the respective message is received.

According to at least one embodiment, the method further comprises the step: synchronizing the at least one second clock to the first clock based on the determined clock frequency offset and/or based on the determined clock phase offset, or synchronizing the first clock to the at least one second clock based on the determined clock frequency offset and/or based on the determined clock phase offset.

Synchronizing the at least one second clock to the first clock based on the determined clock frequency offset may be done by adapting a clock frequency of the at least one second clock to a clock frequency of the first clock, i.e., minimizing the clock frequency offset between the respective clocks. Synchronizing the at least one second clock to the first clock based on the determined clock phase offset may be done by adapting a current time of the at least one second clock to the first clock, i.e., minimizing a timing offset between the respective clocks. In particular, also the clock frequency offset and the timing offset between respective clocks may be minimized by synchronizing the respective clocks based on both the determined clock frequency offset and the determined clock phase offset.

Alternatively, the first clock may be synchronized, analogously to the above, to the at least one second clock. In case more than one second device, and correspondingly more than one second clock, is present, this way, a synchronization of the first device to multiple second devices is made possible. An advantage herein is that a one-to-many synchronization is achieved in a resource saving and easy implementable manner. Further, in case multiple second devices are present, analogously also one of the corresponding second clocks may be synchronized to the first clock and/or to second clocks of the other second devices according to the above-described manner.

According to at least one embodiment, the synchronizing of the at least one second or the first clock comprises offsetting timing values of the at least one second or the first clock.

An advantage thereof is that an easy way of synchronizing the respective clocks is provided. For example, such synchronizing may be implemented in software, according to which timing values, such as for example certain timestamps generated by the respective device, are corrected based on the determined clock phase offset and/or the determined clock frequency offset. Clock synchronization may be performed based on clock model parameters, i.e. clock phase offset and clock frequency offset, rather than by physically steering the clock in this embodiment.

According to at least one embodiment, in case the at least one first and the at least one second message are received by at least two second devices and at least two third messages are sent by the at least two second devices: the at least one second clock and/or the first clock are synchronized with respect to the other clocks of the at least two second clocks and/or the first clock based on a weighted zero mean error; or the at least one second clock and/or the first clock are synchronized to one of the other clocks of the at least two second clock and/or the first clock, which serves as a master clock.

The other clocks of the at least two second clocks and/or the first clock, in this context, describe the clocks, except the one which is to be synchronized. For example, in case a first one of two second clocks is to be synchronized, the other clocks, in this case, are the second of the two second clocks and the first clock. In case the first clock is to be synchronized, all second clocks are the other clocks in this context.

An advantage of the above embodiments is that an easily implementable possibility of synchronizing clocks of multiple devices is provided. By synchronizing clocks to a weighted zero mean error, an average system time of multiple clocks comprised in such system is determined, to which single clocks then can be synchronized. This is advantageous in that for synchronizing the clocks, not only one single master clock needs to be trusted, and hence a more reliable synchronization is possible, for example in case such single master clock is erroneous or completely fails.

Alternatively, clocks may be synchronized to one master clock. In case, for example, one device has a more reliable clock, it is advantageous to synchronize other clocks to that device's clock being used as master clock. Also in case one device has a clock that is being synchronized to another entity, such as, for example, a first device serving as a gateway between an indoor navigation system having multiple second devices and a global navigation satellite system (GNSS) satellite, it is possible to synchronize the first device to the GNSS satellite and then synchronize the second devices to the first device according to the above-described method, wherein the first device provides the master clock, to which each of the second devices may be synchronized.

According to a second aspect, an apparatus comprises a processor, a receiver and a second clock, wherein:

- the receiver is arranged to receive a first message from a first device, wherein information regarding a time of departure of the first message is in the first message, and to receive a second message from the first device, wherein information regarding a time of departure of the second message is in the second message; and
- the processor is arranged to determine a time of arrival of the first message and a time of arrival of the second message, wherein a clock frequency offset between a first clock of the first device and the second clock is determined based on the time of departure of the first message, the time of arrival of the first message, the time of departure of the second message, and the time of arrival of the second message.

According to at least one embodiment, the apparatus further comprises a transmitter, wherein:

the transmitter is arranged to send a third message to the first device; and the processor is further arranged to determine a time of departure of the third message, wherein a clock phase offset between the first clock and the second clock is determined based on the time of arrival of the first message, the time of departure of the first message, the time of arrival of the second message, the time of departure of the second message, the time of departure of the third message, and a time of arrival of the third message.

According to at least one embodiment, the clock frequency offset and/or the clock phase offset is determined by the processor of the apparatus or by an external device.

An advantage of determining the respective offsets by the processor of the apparatus is that overhead is kept low, since it is directly the apparatus itself which may determine those offsets. An advantage of determining the respective offsets by an external device is that processing resources of the apparatus are saved and, in particular in case multiple apparatuses like the one described above are present, a central entity may be used to determine the respective offsets for multiple apparatuses.

According to at least one embodiment, the processor is further arranged to synchronize the second clock to the first clock based on the determined clock frequency offset and/or the determined clock phase offset by offsetting timing values of the second clock.

According to a third aspect, a system comprises a first device and at least one apparatus according to the second aspect.

According to a fourth aspect, a computer program product comprises instructions which, when executed on a computer, cause the computer to perform the method according to the first aspect.

According to a fifth aspect, a computer readable storage medium comprises the computer program product according to the fourth aspect.

Advantages and embodiments of the second to fifth aspect may correspondingly apply and be combined with those described with respect to the first aspect and vice versa.

BRIEF DESCRIPTION OF DRAWINGS

The above-mentioned aspects of the disclosure and their embodiments will be explained in more detail in the following with the aid of the drawings. Elements and functional blocks having the same or similar function bear the same reference numerals throughout the drawings. Hence their description is not necessarily repeated in following drawings.

In the drawings.

DESCRIPTION OF EMBODIMENTS

Figure 1:
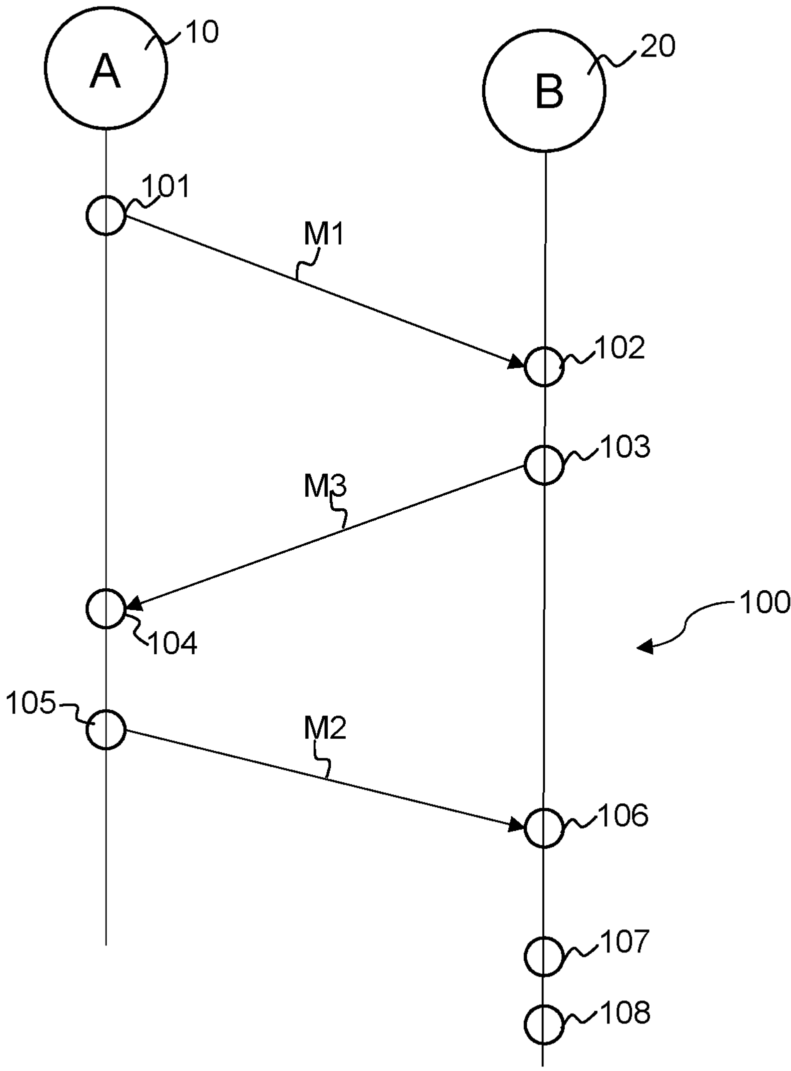
FIG. 1 shows a schematic flowchart of a method for determining a clock frequency offset and a clock phase offset according to one embodiment of the disclosure.

FIG. 1 shows a schematic flowchart of a method 100 for determining a clock frequency offset and a clock phase offset according to one embodiment of the disclosure. The flowchart of the method 100 shows messages being exchanged between a first device 10 and a second device 20 in order to determine a clock frequency offset and a clock phase offset between a first clock, not shown herein, of the first device 10 and a second clock, not shown herein, of the second device 20.

In a step 101, the first device 10 sends a first message M1 to the second device 20. The first message M1 is sent by the first device 10 at a certain time instance, which is defined as the time of departure $td_1^A$ of the first message M1 from the first device 10. The time of departure $td_1^A$ is related to the first clock of the first device. The time of departure $td_1^A$ of the first message M1 is in the first message M1. In this example, the time of departure $td_1^A$ is embedded in form of a timestamp, included in and transmitted together with the first message M1, for example in a header of the first message M1. Alternatively, the time of departure $td_1^A$ could be implicit in the first message M1, not in form of an explicit timestamp, but based on a scheduling of the first message, known to the second device 20, such that the second device 20 would know from the schedule, when receiving the first message M1, that the first message M1 was sent by the first device 10 at such certain time instance.

In a further step 102, the first message M1 is received by the second device 20. The first message M1 is received by the second device 20 at a certain time instance, which is defined as the time of arrival $ta_1^B$ of the first message M1 at the second device 20. The second device 20 detects the time of arrival $ta_1^B$ of the first message M1, which is measured by the second clock of the second device 20, and stores the time of arrival $ta_1^B$. The second device 20 further obtains the time of departure $td_1^A$ of the first message M1 from the first message M1 and stores it.

In a further step 103, the second device 20 sends a third message M3 to the first device 10. The third message M3 is sent by the second device 20 at a certain time instance, which is defined as the time of departure $td_3^B$ of the third message M3 from the second device 20. The time of departure $td_3^B$ is measured and stored by the second device 20, in this embodiment. Alternatively, as described with reference to the first message M1, also the time of departure $td_3^B$ could be determined by the second device 20 based on a scheduling of the third message M3. In either case, the time of departure $td_3^B$ relates to the second clock of the second device 20.

In a further step 104, the third message M3 is received by the first device 10. The third message M3 is received by the first device 10 at a certain time instance, which is defined as the time of arrival $ta_3^A$ of the third message M3 at the first device 10. The first device 10 detects the time of arrival $ta_3^A$ of the third message M3, which is measured by the first clock of the first device 10.

In a further step 105, the first device 10 sends a second message M2 to the second device 20. The second message M2 is sent by the first device 10 at a certain time instance, which is defined as the time of departure $td_2^A$ of the second message M2 from the first device 10. The time of departure $td_2^A$ is related to the first clock of the first device. The time of departure $td_2^A$ of the second message M2 is embedded in the second message M2. Additionally, also the time of arrival $ta_3^A$ of the third message M3 is in the second message M2. In this example, the time of departure $td_2^A$ and the time of arrival $ta_3^A$ are embedded in form of a timestamp, as described above with regard to the time of departure $td_1^A$.

However, as also described above, also different implementations of communicating the respective time instances are possible.

In this embodiment, as shown in FIG. 1, the third message M3 is sent and received before the second message M2 is sent and received. However, this sequence may also be changed, in particular in case the time of arrival of the third message $ta_3^A$ is not transmitted in form of a timestamp in the second message M2, but, for example, in form of the above-described scheduling.

In a further step 106, the second message M2 is received by the second device 20. The second message M2 is received by the second device 20 at a certain time instance, which is defined as the time of arrival $ta_2^B$ of the second message M2 at the second device 20. The second device 20 detects the time of arrival $ta_2^B$ of the second message M2, which is measured by the second clock of the second device 20, and stores the time of arrival $ta_2^B$. The second device further obtains the time of departure $td_2^A$ of the second message M2 and the time of arrival $ta_3^A$ of the third message M3 from the second message M2 and stores those.

In a further step 107, the second device 20 then determines a clock frequency offset $f_0^{BA}$ and a clock phase offset $\tau_0^{BA}$ between the first clock of the first device 10 and the second clock of the second device 20 from the above-mentioned times of arrivals and times of departures.

The clock frequency offset $f_0^{BA}$ between the first and the second device may be determined, for example, according to the following formula:

$$f_0^{BA} = \frac{(ta_2^B - ta_1^B) - (td_2^A - td_1^A)}{(td_2^A - td_1^A)}$$

The clock phase offset $\tau_0^{BA}$ between the first and the second device may be determined, for example, according to the following formula:

$$\tau_0^{BA} = \frac{(ta_1^B + td_3^B) - (ta_3^A + td_1^A) - f_0^{BA}(ta_3^A - td_1^A)}{2}$$

The clock frequency offset $f_0^{BA}$ and the clock phase offset $\tau_0^{BA}$ may therefore be determined based only on the times of arrival and times of departure of the first, second and third message.

In a further step 108, the second device 20 then synchronizes its second clock to the first clock according to the determined clock frequency offset $f_0^{BA}$ and the determined clock phase offset $\tau_0^{BA}$. The synchronizing may be done, for example, using a frequency and phase locked loop, which is a second order tracking loop. This synchronization provides a consistent clock alignment, which can be reliably interpolated over long time intervals. Alternatively, however, also only synchronizing the second clock based on the determined clock frequency offset $f_0^{BA}$ or the determined clock phase offset $\tau_0^{BA}$ is possible.

With the method 100 disclosed herein, as well as in the following embodiments described below, the second order clock error is canceled out when calculating the offset values as described above. Therefore, the interval between clock synchronization message exchanges can be much longer, for example, of a magnitude of 100 milliseconds or even up to 1 second, for mainstream low cost temperature compensated crystal oscillators, TCXOs. In case of high accuracy, high precision clocks being used, such as rubidium, caesium clocks, hydrogen maser clocks, etc., even longer time intervals may be achieved.

Figure 2:
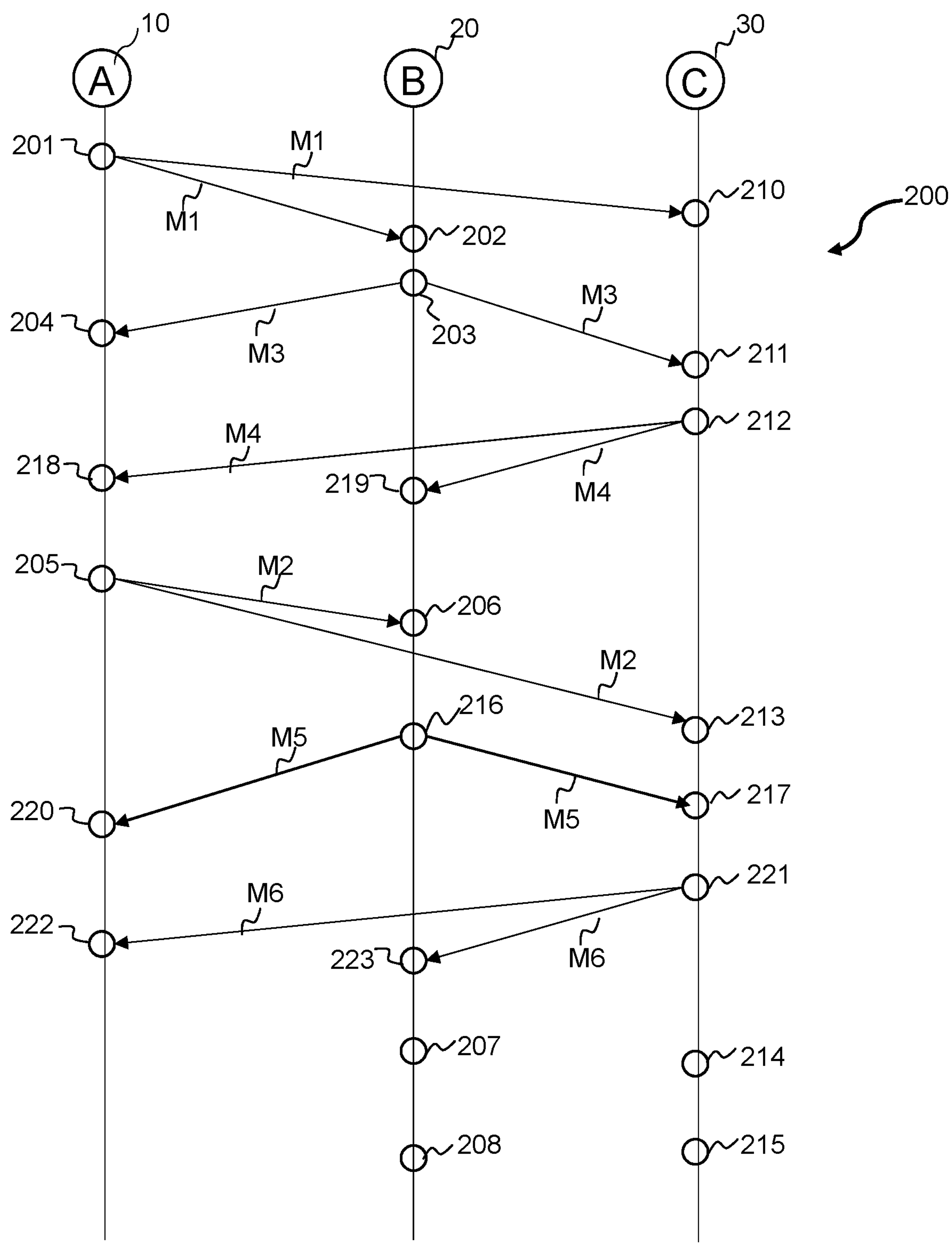
FIG. 2 shows a schematic flowchart of a method for determining a clock frequency offset and a clock phase offset according to another embodiment of the disclosure.

FIG. 2 shows a schematic flowchart of a method 200 for determining a clock frequency offset and a clock phase offset according to another embodiment of the disclosure. The flowchart of the method 200 shows messages being exchanged between a first device 10, a second device 20 and a third device 30 in order to determine clock frequency offsets and clock phase offsets between those devices 10, 20, 30.

The first and second device 10, 20 may correspond to those described with reference to FIG. 1. The third device has a third clock, not shown herein. Moreover, a sending of a first message M1 in a step 201, a receiving of the first message M1 in a step 202, a sending of a third message M3 in a step 203, a receiving of the third message M3 in a step 204, a sending of a second message M2 in a step 205 and a receiving of the second message M2 in a step 206 may be performed according to the corresponding steps as described with respect to FIG. 1 and is not repeated herein.

Additionally to the sending of the first message M1 from the first device 10 to the second device 20, the first message M1 is also sent from the first device 10 to the third device 30. In this embodiment, the first message M1 is broadcast and received by both, the second and third device 20, 30. The first message M1 is received by the third device 30 in a step 210. Alternatively, however, the first message M1 could also be sent as two separate messages to the second and third device 20, 30, at the same or different moments in time. This may apply to any of the messages discussed herein and is not repeated in the following.

Analogously to the receiving of the first message M1 by the second device 20 in step 202, the third device 30 detects a time of arrival $ta_1^C$ of the first message M1 at the third device 30, which is measured using the third clock of the third device 30, and stores the time of arrival $ta_1^C$. The third device 30 further obtains the time of departure $td_1^A$ of the first message M1 from the first message M1 and stores it.

Analogously to the above, in step 203, the third message M3 having the time of departure $td_3^B$ is broadcast by the second device 20 and received, in addition to the receiving of the third message M3 by the first device 10, by the third device 30 in a step 211. Thereby, a time of arrival $ta_3^C$ of the third message M3 at the third device 30 is measured and stored by the third device 30, and the time of departure $td_3^B$ is obtained from the third message M3 and stored by the third device 30.

At a step 212, the third device 30 broadcasts a fourth message M4. The fourth message M4 has embedded a time of departure $td_4^C$ of the fourth message M4. Moreover, the fourth message M4 may contain the time of arrival $ta_1^C$ of the first message M1 at the third device 30 and/or the fourth message M4 may contain the time of arrival $ta_3^C$ of the third message M3 at the third device 30. The fourth message M4 is received, by the first and second device 10, 20, respectively, at steps 218 and 219.

Analogously to the first message M1, in step 205 also the second message M2 is broadcast, by the first device 10. The second message M2 is received in a step 213, in addition to the receiving of the second message M2 by the second device 20, by the third device 30 at a time of arrival $ta_2^C$ of the second message M2 at the third device 30, which is measured by the third clock of the third device 30 and stored by the third device 30.

In a step 207, the second device 20 determines a clock frequency offset $f_0^{BA}$ and a clock phase offset $\tau_0^{BA}$ between the first clock of the first device 10 and the second clock of the second device 20. This corresponds to the step 107 as described with reference to FIG. 1 and may be determined, for example, according to the equations discussed with regard to FIG. 1.

Moreover, in a step 214, a clock frequency offset $f_0^{CA}$ and a clock phase offset $\tau_0^{CA}$ between the first clock of the first device 10 and the third clock of the third device 20 may be determined by the third device 30.

The clock frequency offset $f_0^{CA}$ between the first and the third device may be determined, for example, according to the following formula:

$$f_0^{CA} = \frac{(ta_2^C - ta_1^C) - (td_2^A - td_1^A)}{(td_2^A - td_1^A)}$$

The clock phase offset $\tau_0^{CA}$ between the first and the third device may be determined, for example, according to the following formula:

$$\tau_0^{CA} = \frac{(ta_1^C + td_4^C) - (ta_4^A + td_1^A) - f_0^{CA}(ta_4^A - td_1^A)}{2}$$

The clock frequency offset $f_0^{CA}$ and the clock phase offset $\tau_0^{CA}$ may therefore be determined based only on the times of arrival and times of departure of the first, second and fourth message.

In a further step 208, the second device 20 then synchronizes its second clock to the first clock according to the determined clock frequency offset $f_0^{BA}$ and the determined clock phase offset $\tau_0^{BA}$. Analogously, in a step 215, the third device 30 synchronizes its third clock to the first clock according to the determined clock frequency offset $f_0^{CA}$ and the determined clock phase offset $\tau_0^{CA}$.

In this embodiment, the sending of the first, third and fourth message M1, M3, M4 is part of a periodic sending of those respective messages. Accordingly, the sending of the second message M2 is, in fact, a periodic repetition of the sending of the first message M1. Furthermore, according to said periodic sending, the second device 20 may further broadcast a fifth message M5, corresponding to the sending of the third message M3, at a time of departure $td_5^B$ at a step 216, the fifth message M5 having the time of departure $td_5^B$ embedded in the fifth message M5. The third device 30 may receive the fifth message M5 at a time of arrival $ta_5^C$ at a step 217, the first device 10 may receive the fifth message M5 at a time of arrival $ta_5^A$ at a step 220.

Furthermore, analogously to the broadcasting of the fourth message M3, the third device 30 also broadcasts a sixth message M6 at a step 221 according to said periodicity. The sixth message M6 is received by the first and second device 10, 20, respectively, at steps 222 and 223. This generally corresponds to the sending and receiving of the previous messages, and details are not repeated herein.

Analogously to the above, the third device 30 may also determine a clock frequency offset $f_0^{CB}$ and a clock phase offset $\tau_0^{CB}$ between the second device 20 and the third device 30. The third device 30 may then, alternatively to synchronizing its third clock to the first clock of the first device 10, synchronize its third clock to the second clock of the second device 20.

Further alternatively, however, the third device 30 may also determine a weighted zero mean error of its third clock based on the clock frequency offsets $f_0^{CA}$ and $f_0^{CB}$ and the clock phase offsets $\tau_0^{CA}$ and $\tau_0^{CB}$. In that case, instead of synchronizing its third clock to a single other device, the third device may correct its timing values based on said weighted zero mean error, i.e., based on a weighted average of the offsets from the first and second devices 10, 20.

Due to the broadcasting of the messages described herein, the method 200 is scalable with respect to the number of devices determining the respective clock phase offsets and clock frequency offsets and the scope of the disclosure shall not be limited with regard to the three devices shown in FIG. 2.

Further, due to the periodic sending of the respective messages described above, the respective clocks of the devices 10, 20, 30 may be tracked and synchronized continuously. The respective clock frequency offsets and clock phase offsets may be determined periodically and the synchronizing of the clocks may be performed periodically. This is in particular advantageous in mobile and fluid networks that are not fixed with continually changing connectivities because fully redundant clock tracking is made possible.

In the embodiment shown in FIG. 2, the determining of the respective clock phase offsets and clock frequency offsets and the corresponding synchronization of the respective clocks is shown after two cycles of the periodic sending of the messages M1 to M3, i.e., M1 to M6 in total. However, this is merely to be understood exemplary and the periodic determining of those offsets and the periodic synchronizing may be performed once the required messages and respective times of arrival and times of departure for determining the offsets according to the above-described method have been sent and received.

Figure 3:
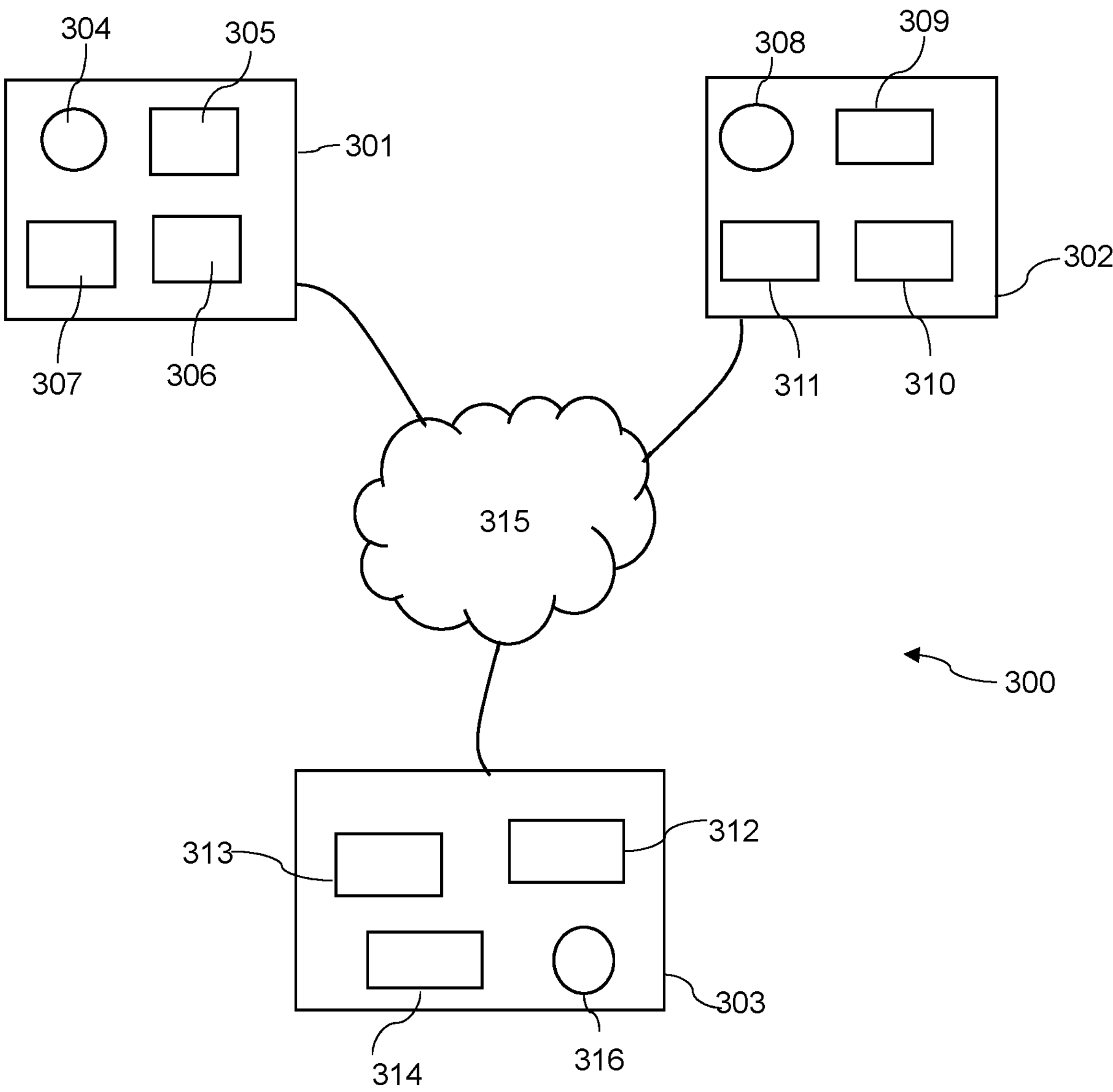
FIG. 3 shows a system according to one embodiment of the disclosure.

FIG. 3 shows a system 300 according to one embodiment of the disclosure. The system 300 may be, for example, a 5G small cell or an indoor positioning system. The system 300 comprises a first apparatus 301 and a second apparatus 302. The first and second apparatus 301, 302 may be, for example, anchors of the aforementioned indoor positioning system. To provide an easily understandable description of the concept of the disclosure, only two apparatuses 301, 302 are shown herein. However, the system 300 may, of course, also comprise further apparatuses corresponding to those described herein.

The system 300 further comprises a central controlling entity 303. The central controlling entity may be, for example, a GNSS receiver of the aforementioned indoor positioning system, which may be used as a gateway to synchronize the first and second apparatus 301, 302 of the indoor positioning system to a GNSS satellite, wherein the first and second apparatus 301, 302 are out of sight of the GNSS satellite. The central controlling apparatus 303, in this case, is synchronized to a GNSS satellite, not shown herein.

The first apparatus 301 comprises a first clock 304, a first receiver 305, a first transmitter 306 and a first processor 307. The second apparatus 302 comprises a second clock 308, a second receiver 309, a second transmitter 310 and a second processor 311. The central controlling entity 303 comprises a third receiver 312, a third transmitter 313, a third processor 314 and a third clock 316. The third cock 316, as mentioned above, is synchronized to a GNSS satellite, and therefore serves as a master clock for the system 300. The central controlling entity 303, the first apparatus 301 and the second apparatus 302 may communicate with each other via a wireless network 315.

In this embodiment, the central controlling entity 303 broadcasts a first message using its third transmitter 313 via the wireless network 315 and the first message is received by the second apparatus 302 and the first apparatus 301 with their respective receivers 309, 305. The first message is broadcast by the central controlling entity 303 according to a predetermined schedule, which is known to the first and second apparatus 301, 302. The first message is broadcast, for example, every 100 milliseconds according to a Wireless-Fidelity, Wi-Fi, standard, i.e., a standard according to the IEEE 802.11 family of standards.

Alternatively, the first message may also be broadcast, for example, every second, or even every 10 seconds.

When the first and second apparatus 301, 302 receive the first message, the first and second apparatus 301, 302, according to the schedule, each know that the central controlling entity 303 passed the beginning of such 100 millisecond period, according to its third clock 316, which in this case is used as a reference for a time of departure of the first message. This reference is unambiguous, since the apparatuses 301, 302 and the central controlling entity 303 are located so close to each other in the system 300, that a transmission time of the message is shorter than the period for the sending of the scheduled message.

Further, the first apparatus 301 broadcasts a third message using its first transmitter 306 via the wireless network 315. The third message is also broadcast according to a scheduling, such that the central controlling entity 303 and the second apparatus 302 obtain, when receiving the third message, a time of departure of the third message according to the schedule, as discussed with reference to the first message above.

Further, the central controlling entity 303 is arranged to broadcast a second message, according to a schedule, having embedded a time of arrival of the third message at the central controlling entity 303 measured by the third clock 316. When the first and second apparatus 301, 302 receive the second message, the first and second apparatus 301, 302 obtain the time of arrival of the third message at the central controlling entity 303 and the time of departure of the second message, analogously to the above.

Correspondingly, the second apparatus 302 may also broadcast a fourth message, which may be received by the central controlling entity 303 and the first apparatus 301.

The first processor 307 of the first apparatus 301 is then able to determine a clock phase offset and a clock frequency offset of the first clock 304 from the third clock 316 based on the obtained timing information from the first, second and third messages. Correspondingly, the second processor 311 of the second apparatus 302 is able to determine a clock phase offset and a clock frequency offset of the second clock 308 from the third clock 316 based on the obtained timing information from the first, second and fourth messages. This may be done according to the equations discussed with respect to FIGS. 1 and 2.

The first apparatus 301 may then, with its first processor 307, correct timing values of the first clock 304 based on the obtained offsets. The second apparatus 302 may then, with its second processor 311, correct timing values of the second clock 308 based on the obtained offsets.

Alternatively, it would also be possible for the central controlling entity 303, to determine offsets of the clocks of the first and second apparatus 301, 302 and to communicate those to the respective apparatus. Alternatively, also a weighted zero mean error may be determined, based on which of the clocks of the first and second apparatus 301, 302 are corrected, as discussed above with regard to FIG. 2.

In the embodiment of FIG. 3, in case one of the apparatuses 301, 302 loses connection to the central controlling entity 303, said apparatus may still synchronize its respective clock indirectly to the third clock 316 of the central controlling entity 303, which serves as a master clock, by synchronizing its clock to the clock of the other apparatus, which is synchronized to the third clock 316.

For example in the embodiment of FIG. 3, assuming that the second apparatus 302 cannot receive messages from the central controlling entity 303. However, the second apparatus 302 still receives messages from the first apparatus 301 and vice versa, and the first apparatus 301 receives messages from the central controlling entity 303 and vice versa. The first apparatus 301 synchronizes the first clock 304 to the third clock 316 according to the exchange of messages described above. The second apparatus synchronizes the second clock 308 to the first clock 304 corresponding to the above, based on the third, fourth and a fifth message as described with respect to the method as shown in FIG. 2. This way, the second apparatus 302 may still synchronize its second clock 308 to the third clock 316, even when the second apparatus 302 cannot receive the first and second message broadcast by the central controlling entity 303.

Figure 4:
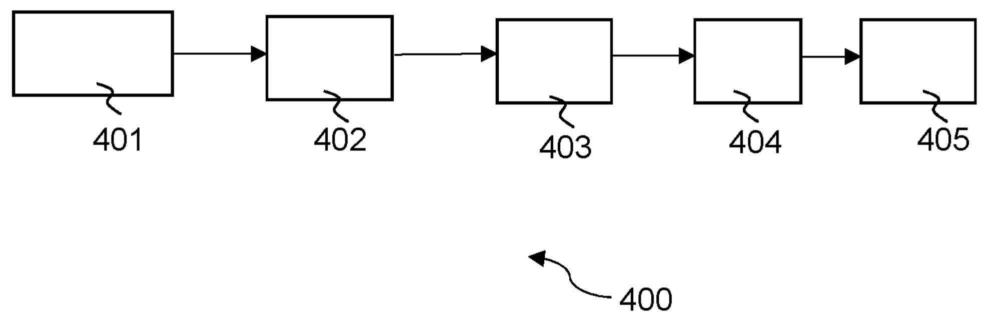
FIG. 4 shows a schematic flowchart of a method for determining a clock frequency offset according to one embodiment of the disclosure.

FIG. 4 shows a schematic flowchart of a method 400 for determining a clock frequency offset according to one embodiment of the disclosure.

In a step 401, at least one second device receives at least one first message from a first device, wherein information regarding a time of departure of the at least one first message is in the at least one first message.

In a step 402, the at least one second device determines a time of arrival of the at least one first message.

In a step 403, the at least one second device receives at least one second message from the first device, wherein information regarding a time of departure of the at least one second message is in the at least one second message.

In a step 404, the at least one second device determines a time of arrival of the at least one second message.

In a step 405, a clock frequency offset between the first clock and the at least one second clock is determined based on the time of departure of the at least one first message, the time of arrival of the at least one first message, the time of departure of the at least one second message, and the time of arrival of the at least one second message.

Figure 5:
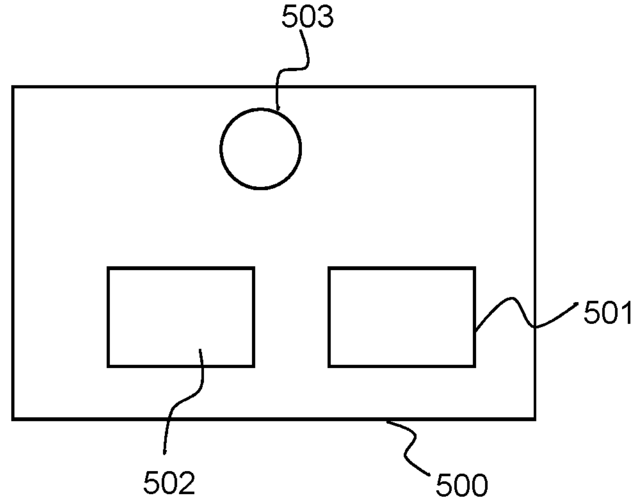
FIG. 5 shows an apparatus according to one embodiment of the disclosure.

FIG. 5 shows an apparatus 500 according to one embodiment of the disclosure. The apparatus 500 comprises a processor 501, a receiver 502 and a second clock 503.

The receiver 502 is arranged to receive a first message from a first device, wherein information regarding a time of departure of the first message is in the first message, and to receive a second message from the first device, wherein information regarding a time of departure of the second message is in the second message.

The processor 501 is arranged to determine a time of arrival of the first message and a time of arrival of the second message, wherein a clock frequency offset between a first clock of the first device and the second clock 503 is determined based on the time of departure of the first message, the time of arrival of the first message, the time of departure of the second message, and the time of arrival of the second message.

In the above-mentioned embodiments, features, which are described with respect to one of the embodiments, generally also can be transferred correspondingly to the other embodiments. Further, some technical features are only described once, at their first occurrence. However, a skilled person readily understands that those equally apply to the corresponding entities and steps described subsequently.

LIST OF REFERENCE SIGNS

10 first device
20 second device

30 third device
M1 first message
M2 second message
M3 third message
M4 fourth message
M5 fifth message
M6 sixth message
100, 200, 400 method
101 to 108 steps
201 to 223 steps
401 to 405 steps
300 system
301 first apparatus
302 second apparatus
303 central controlling entity
304 first clock
305 first receiver
306 first transmitter
307 first processor
308 second clock
309 second receiver
310 second transmitter
311 second processor
312 third receiver
313 third transmitter
314 third processor
315 wireless network
316 third clock
500 apparatus
501 processor
502 receiver
503 second clock

The invention claimed is:

1. A method for determining a clock frequency offset between a first device having a first clock and at least two second devices, each second device having a respective second clock, the method comprising:

receiving, by the at least two second devices, at least one first message from the first device, wherein information regarding a time of departure of the at least one first message is in the at least one first message;

determining, by the at least two second devices, a time of arrival of the at least one first message;

receiving, by the at least two second devices, at least one second message from the first device, wherein information regarding a time of departure of the at least one second message is in the at least one second message;

determining, by the at least two second devices, a time of arrival of the at least one second message;

determining a clock frequency offset between the first clock and the second clocks based on the time of departure of the at least one first message, the time of arrival of the at least one first message, the time of departure of the at least one second message, and the time of arrival of the at least one second message sending, by the at least two second devices, third messages to the first device, wherein times of departure of the third messages are determined by the at least two second devices; and determining a clock phase offset between the first clock and the second clocks based on the time of arrival of the at least one first message, the time of departure of the at least one first message, the time of arrival of the at least one second message, the time of departure of the at least one second message, the time of departures of the third messages, and times of arrival of the third messages, wherein a subset of the second clocks and/or the first clock is synchronized with respect to a remaining at least one other second clock of the at least two second devices and/or the first clock based on a weighted zero mean error.

2. The method according to claim 1, wherein the time of departure of the at least one first message is a time, related to the first clock, at which the at least one first message is sent by the first device;

the time of arrival of the at least one first message is a time, related to the second clocks, at which the at least one first message is received by the at least two second devices;

the time of departure of the at least one second message is a time, related to the first clock, at which the at least one second message is sent by the first device; and the time of arrival of the at least one second message is a time, related to the second clocks, at which the at least one second message is received by the second devices.

3. The method according to claim 1, wherein the times of departure of the third messages are times, related to the second clocks, respectively, at which the third messages are sent by the second devices; and the times of arrival of the third messages are times, related to the first clock, at which the third messages are received by the first device.

4. The method according to claim 1, wherein the information regarding the time of departure of the at least one first message and/or of the at least one second message and/or of the third messages is in the at least one first and/or second and/or third messages:

embedded in form of a timestamp in the at least one first and/or second and/or third messages; or derivable from a predetermined scheduling of the at least one first and/or second and/or third messages.

5. The method according to claim 1, wherein the method further comprises:

synchronizing the second clocks to the first clock based on the determined clock frequency offset and/or based on the determined clock phase offset; or synchronizing the first clock to the second clocks based on the determined clock frequency offset and/or based on the determined clock phase offset.

6. The method according to claim 5, wherein the synchronizing of the second clocks or the first clock comprises offsetting timing values of the second clocks or the first clock.

7. A system comprising a processor, a receiver, a transmitter, and a second clock, wherein:

the receiver is arranged to receive, on a periodic basis, a first message from a first device, wherein information regarding a time of departure of the first message is in the first message, and to receive, on the periodic basis, a second message from the first device, wherein information regarding a time of departure of the second message is in the second message;

the processor is arranged to determine a time of arrival of the first message and a time of arrival of the second message, wherein a clock frequency offset between a first clock of the first device and the second clock is determined based on the time of departure of the first message, the time of arrival of the first message, the time of departure of the second message, and the time of arrival of the second message;

the transmitter is arranged to send a third message to the first device; and the processor is further arranged to determine a time of departure of the third message, wherein a clock phase offset between the first clock and the second clock is determined based on the time of arrival of the first message, the time of departure of the first message, the time of arrival of the second message, the time of departure of the second message, the time of departure of the third message, and a time of arrival of the third message, wherein the processor is further arranged to synchronize the second clock to the first clock based on a weighted zero mean error.

8. The system according to claim 7, wherein the clock frequency offset and/or the clock phase offset is determined, on the periodic basis, by the processor of the system or by an external device.

9. The system of claim 7 comprising:

the first device.

10. One or more tangible, non-transitory, computer-readable media storing instructions that, when executed by one or more processors, cause the one or more processors to perform operations comprising:

receiving, on a periodic basis by at least one second device having at least one second clock, at least one first message from a first device having a first clock, wherein information regarding a time of departure of the at least one first message is in the at least one first message;

determining, by the at least one second device, a time of arrival of the at least one first message;

receiving, on the periodic basis by the at least one second device, at least one second message from the first device, wherein information regarding a time of departure of the at least one second message is in the at least one second message;

determining, by the at least one second device, a time of arrival of the at least one second message;

determining, on the periodic basis, a clock frequency offset between the first clock and the at least one second clock based on the time of departure of the at least one first message, the time of arrival of the at least one first message, the time of departure of the at least one second message, and the time of arrival of the at least one second message;

sending, by the at least one second device, at least one third message to the first device, wherein times of departure of the at least one third message are determined by the at least one second device; and determining a clock phase offset between the first clock and the second clocks based on the time of arrival of the at least one first message, the time of departure of the at least one first message, the time of arrival of the at least one second message, the time of departure of the at least one second message, the time of departures of the at least one third message, and times of arrival of the at least one third message, wherein the at least one second clock and the first clock are synchronized to a weighted zero mean error.

* * * * *